(12) United States Patent
Srinivasan et al.

(10) Patent No.: US 10,235,447 B2
(45) Date of Patent: Mar. 19, 2019

(54) METHOD AND SYSTEM FOR CO-OPERATIVE INTELLIGENT HMIS FOR EFFECTIVE PROCESS OPERATIONS

(71) Applicant: Honeywell International Inc., Morristown, NJ (US)

(72) Inventors: Ranganathan Srinivasan, Bangalore (IN); Mandar Vartak, Bangalore (IN); Ravi Kumar Ramamurthy, Bangalore (IN); Navaneeth Vengallur, Bangalore (IN); Andrew John Trenchard, Hampshire (GB)

(73) Assignee: Honeywell International Inc., Morris Plains, NJ (US)

( * ) Notice: Subject to any disclaimer, the term of this patent is extended or adjusted under 35 U.S.C. 154(b) by 368 days.

(21) Appl. No.: 14/814,296

(22) Filed: Jul. 30, 2015

(65) Prior Publication Data

US 2017/0032022 A1     Feb. 2, 2017

(51) Int. Cl.
  *G06F 17/30*     (2006.01)
(52) U.S. Cl.
  CPC .............................. *G06F 17/30601* (2013.01)
(58) Field of Classification Search
  CPC .................................................. G06F 17/30601
  See application file for complete search history.

(56) References Cited

U.S. PATENT DOCUMENTS

| | | | | |
|---|---|---|---|---|
| 6,009,431 A | * | 12/1999 | Anger | H04L 41/0213 |
| | | | | 707/741 |
| 6,425,006 B1 | * | 7/2002 | Chari | H04L 41/0213 |
| | | | | 370/242 |
| 6,714,977 B1 | * | 3/2004 | Fowler | H04L 12/2825 |
| | | | | 700/83 |
| 2010/0257412 A1 | * | 10/2010 | Acuna | G06F 11/0727 |
| | | | | 714/54 |
| 2012/0116590 A1 | * | 5/2012 | Florez-Larrahondo | ..... |
| | | | | G06F 1/206 |
| | | | | 700/275 |

(Continued)

FOREIGN PATENT DOCUMENTS

| | | |
|---|---|---|
| JP | 2004085268 A | 3/2004 |
| JP | 2010282466 A | 12/2010 |
| JP | 2011060126 A | 3/2011 |

OTHER PUBLICATIONS

International Searching Authority, "Notification of Transmittal of the International Search Report and the Written Opinion of the International Searching Authority, or the Declaration," International Application No. PCT/US2016/043293, dated Nov. 1, 2016, 6 pages, publisher International Application Division Korean Intellectual Property Office, Daejeon, Republic of Korea.

(Continued)

*Primary Examiner* — Rehana Perveen
*Assistant Examiner* — Huen Wong

(57) ABSTRACT

A method implemented using a server includes receiving, from a first application, a tag associated with an equipment, the tag indicating an event. The method also includes retrieving, from at least a second application, at least one of an action or context information linked to the event based on the tag. The method further includes transmitting the tag indicating the event and the action linked to event. In addition, the method includes displaying, on a plant graphic, a location of the event using the tag and the action linked to the event.

15 Claims, 11 Drawing Sheets

(56) References Cited

U.S. PATENT DOCUMENTS

2013/0212186 A1    8/2013  Camp et al.
2014/0282015 A1    9/2014  Nixon et al.

OTHER PUBLICATIONS

International Searching Authority, "Written Opinion of the International Searching Authority," International Application No, PCT/US2016/043293, dated Nov. 1, 2016, 5 pages, publisher International Application Division Korean Intellectual Property Office, Daejeon, Republic of Korea.

* cited by examiner

| CPM SAYS | APC CAN | AM CAN | OPERATOR CAN |
|---|---|---|---|
| STICKY VALVE | RELAX THE LIMITS OF CV AS TIGHT CONTROL CANNOT BE ACHIEVED | SUGGEST TO SHELVE THE ALARM AS ALARM WILL PERSIST UNTIL VALVE REPAIR DONE | REDUCE INTEGRAL ACTION |
| TUNING ISSUE | RELAX CV PERFORMANCE RATIO | NONE | CALL OperTune |
FIG. 3
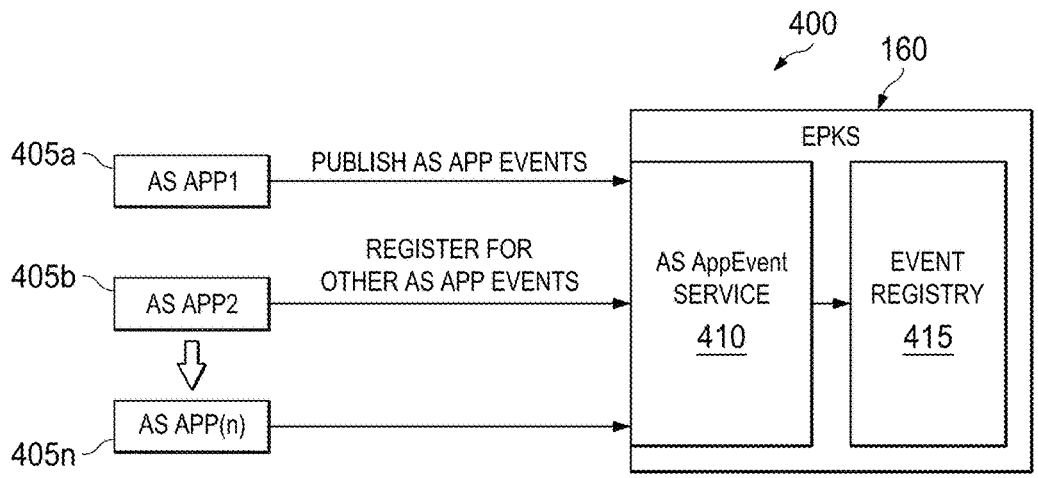
FIG. 4
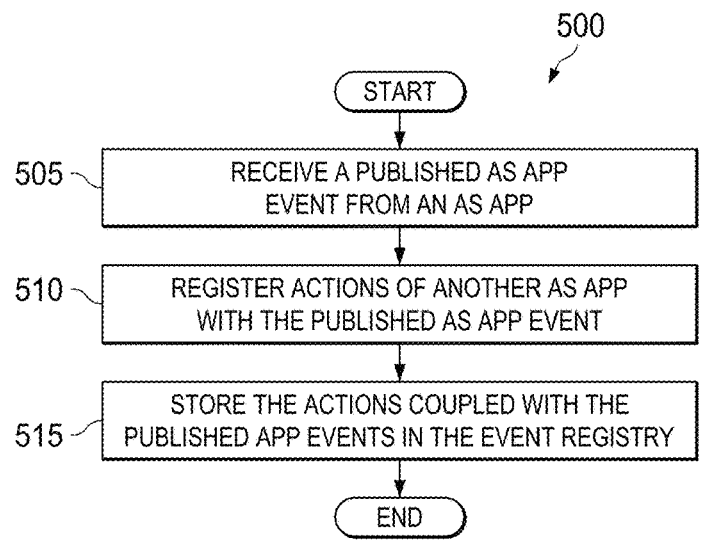
FIG. 5

METHOD AND SYSTEM FOR CO-OPERATIVE INTELLIGENT HMIS FOR EFFECTIVE PROCESS OPERATIONS

TECHNICAL FIELD

This disclosure relates generally to industrial process control and automation systems. More specifically, this disclosure relates to a method and system for an intelligent human machine interface (HMI) for effective process operations.

BACKGROUND

Industrial process control and automation systems, including distributed control systems (DCSs), are often used to automate large and complex industrial processes. These types of systems routinely include sensors, actuators, and controllers. The controllers typically receive measurements from the sensors and generate control signals for the actuators. Through interfaces for individual applications, human-automation interactions improve the throughput, safety, and efficiency of many complex industrial facilities that utilize industrial process control and automation systems.

SUMMARY

This disclosure provides a method and system for wirelessly monitoring and communicating with process machinery using a remote electronic device.

In a first embodiment, a method implemented using a server includes receiving, from a first application, a tag associated with an equipment, the tag indicating an event. The method also includes retrieving, from at least a second application, at least one of an action or contextual information linked to the event based on the tag. The method further includes transmitting the tag indicating the event and the action linked to the event. In addition, the method includes displaying, on a graphical display, a location of the event using the tag and the action linked to the event.

In a second embodiment, an apparatus of a server includes at least one processing device configured to receive, from a first application, a tag associated with an equipment, the tag indicating an event. The at least one processing device is also configured to retrieve, from at least a second application, at least one of an action or contextual information linked to the event based on the tag. The at least one processing device is further configured to transmit the tag indicating the event and the action linked to the event. In addition, the at least one processing device is configured to display, on a graphical display, a location of the event using the tag and the action linked to the event.

In a third embodiment, an apparatus of a server includes at least one processing device configured to receive, from a first application, a tag associated with an equipment, the tag indicating an event of the equipment and metadata associated with the event. The at least one processing device is also configured to retrieve, from at least a second application, at least one of an action or contextual information linked to the event based on the tag. The at least one processing device is further configured to update the metadata associated with the event by collating the action with the event. In addition, the at least one processing device is configured to transmit the tag indicating the event, the updated metadata, and the action linked to the event. The at least one processing device is configured to display, on a graphical display, a location of the event using the tag, the updated metadata, and the action linked to the event.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 3 illustrates an example table of actionable suggestions that a HMI integrated display can provide when a controller performance monitoring (CPM) system detects an occurrence in a DCS according to this disclosure;

FIG. 4 illustrates an example system according to this disclosure;

FIG. 5 illustrates an example method according to this disclosure;

DETAILED DESCRIPTION

FIGS. 1 through 15, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
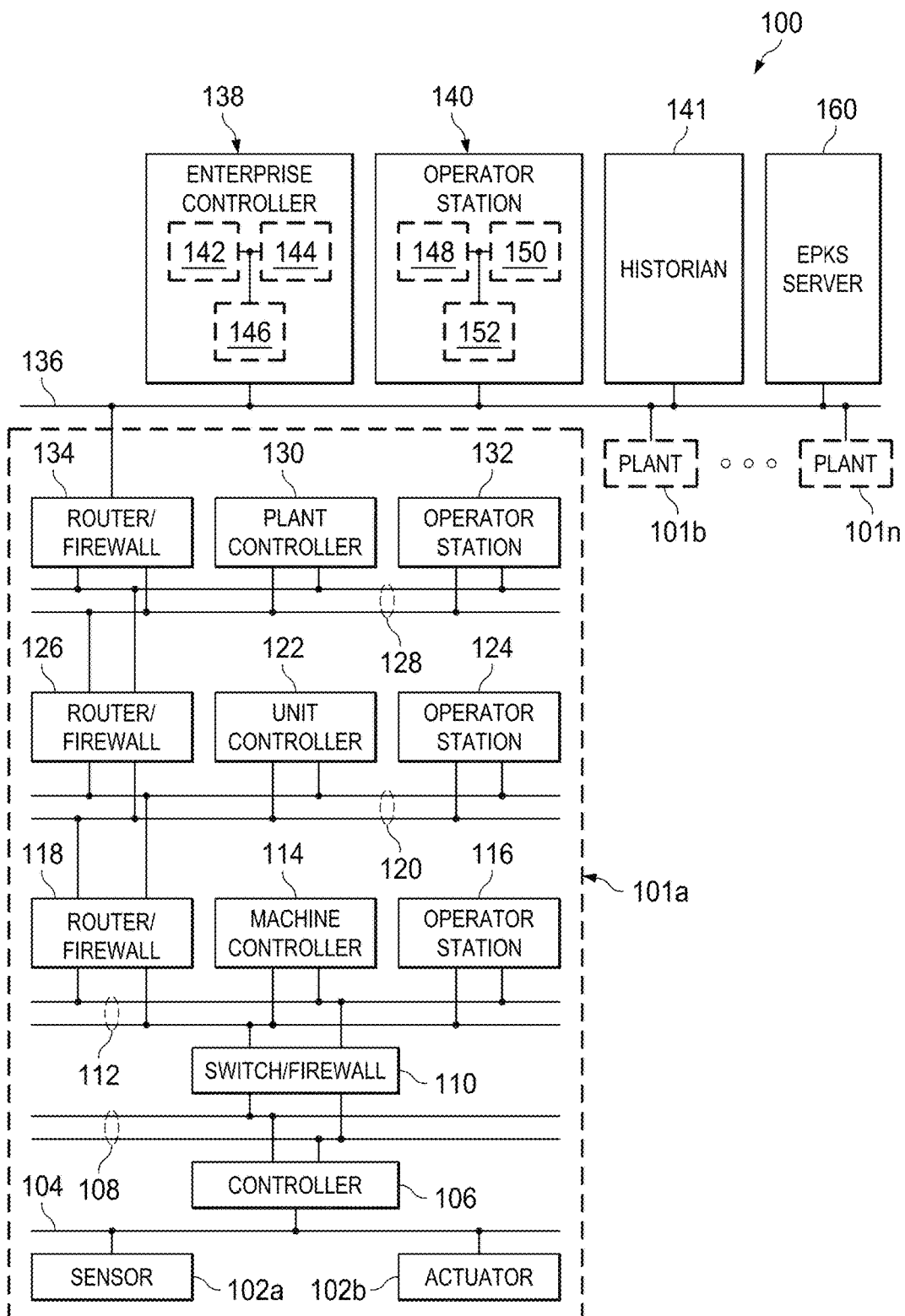
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. In addition, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

In an embodiment, each of the sensors 102a and each of the actuators 102b are associated with an electronic tag of the DCS. Applications (such as Asset Monitoring (AM), Alarm Management (DynAMo), Controller Performance Monitoring (CPM), Advanced Process Control (APC), Real Time Optimizer (RTO) and the like) reference these tags and their associated metadata as their key input configuration to achieve particular objects for different applications. Metadata of tags can include, for example, Process Value (PV), Output (OP), Set Point (SP), mode, and the like. HMIWeb displays can also utilize tags to provide and display different process indications or information. The HMIWeb can be an HMI integrated display (as discussed herein) that utilizes tags received by one or more applications. The HMI integrated display also shows selected, grouped, or relevant information from each of the one or more applications that is actionable or will lead to action or inferences for a particular piece of equipment or measured parameter of a particular piece of equipment in the system 100.

At least one network 104 is coupled to the sensors 102a and actuators 102b. The network 104 facilitates interaction with the sensors 102a and actuators 102b. For example, the network 104 could transport measurement data (via tags and associated metadata) from the sensors 102a, receive status information (also via tags and associated metadata) from one or more actuators 102b, and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as an EXPERION C300 controller by HONEYWELL INTERNATIONAL INC. As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server-computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

Each sensor 102a and actuator 102b can be associated with a tag. Applications can reference tags and their associated metadata as their key input configuration to achieve particular objects for different application. Metadata of tags can include, for example, PV, OP, SP, mode, and the like. The operator stations 116 can generate for display an HMI integrated display. The HMI integrate display utilizes tags to provide different process indications or information. The HMI integrated display utilizes tags received by one or more applications. The HMI integrated display also shows selected, grouped, or relevant information from each of one or more applications that is actionable or will lead to actions or inferences for a particular piece of equipment or a measured parameter of a particular piece of equipment in the system 100.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server-computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

Each sensor 102a and actuator 102b can be associated with a tag. Applications can reference tags and their associated metadata as their key input configuration to achieve particular objects for different application. Metadata of tags can include, for example, PV, OP, SP, mode, and the like. The operator stations 124 can generate for display an HMI integrated display. The HMI integrate display utilizes tags to provide different process indications or information. The HMI integrated display utilizes tags received by one or more applications. The HMI integrated display also shows selected, grouped, or relevant information from each of one or more applications that is actionable or will lead to actions or inferences for a particular piece of equipment or a measured parameter of a particular piece of equipment in the system 100.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server-computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

Similar to the operator stations 116, 124, the operator stations 132 can generate for display an HMI integrated display. The HMI integrate display utilizes tags to provide different process indications or information. The HMI integrated display utilizes tags received by one or more applications as discussed herein. The HMI integrated display also shows selected, grouped, or relevant information from each of one or more applications that is actionable or will lead to actions or inferences for a particular piece of equipment or a measured parameter of a particular piece of equipment in the system 100.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server-computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Similar to the operator stations 116, 124, 132, the operator stations 140 can generate for display an HMI integrated display. The HMI integrated display utilizes tags to provide different process indications or information. The HMI integrated display utilizes tags received by one or more applications as discussed herein. The HMI integrated display also shows selected, grouped, or relevant information from each of one or more applications that is actionable or will lead to actions or inferences for a particular piece of equipment or measured parameter of a particular piece of equipment in the system 100.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In an embodiment, the industrial process control and automation system 100 also includes an Experion Process Knowledge System (EPKS) server 160. Because the applications are independent of each other, the EPKS server 160 stores couplings between tags (along with their associated metadata) and different applications. The EPKS server 160 includes an App Event service that maintains an event registry for events (such as issues identified by tags and their associated metadata) published by applications as well as each application registered to those events. Each application publishes its events through the App event service of the EPKS server 160 and registers with events of other applications for which it can propose an action or solution.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

In some embodiments, various actuators and sensors of the system 100 in FIG. 1 include transmitters that monitor and communicate parameters associated with an enterprise controller (e.g., the enterprise-level controller 138) or an operator station (e.g., the operator station 140). The parameters are associated with actuators or sensors. The transmitters include user interfaces (UIs) that allow for viewing parameters at the transmitter and providing inputs to manipulate parameters associated with the actuators or sensors of the transmitter. These transmitters can be located at difficult to reach or hazardous locations. The UIs located at or near the transmitters can also be difficult to configure, read, and access due to environmental factors.

Although FIG. 1 illustrates one example of an industrial process control and automation system 100, various changes may be made to FIG. 1. For example, a control system could include any number of sensors, actuators, controllers, servers, operator stations, networks, and the like. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, the functionality of the example environment of FIG. 1 can be used in any other suitable device or system.

Figure 2:
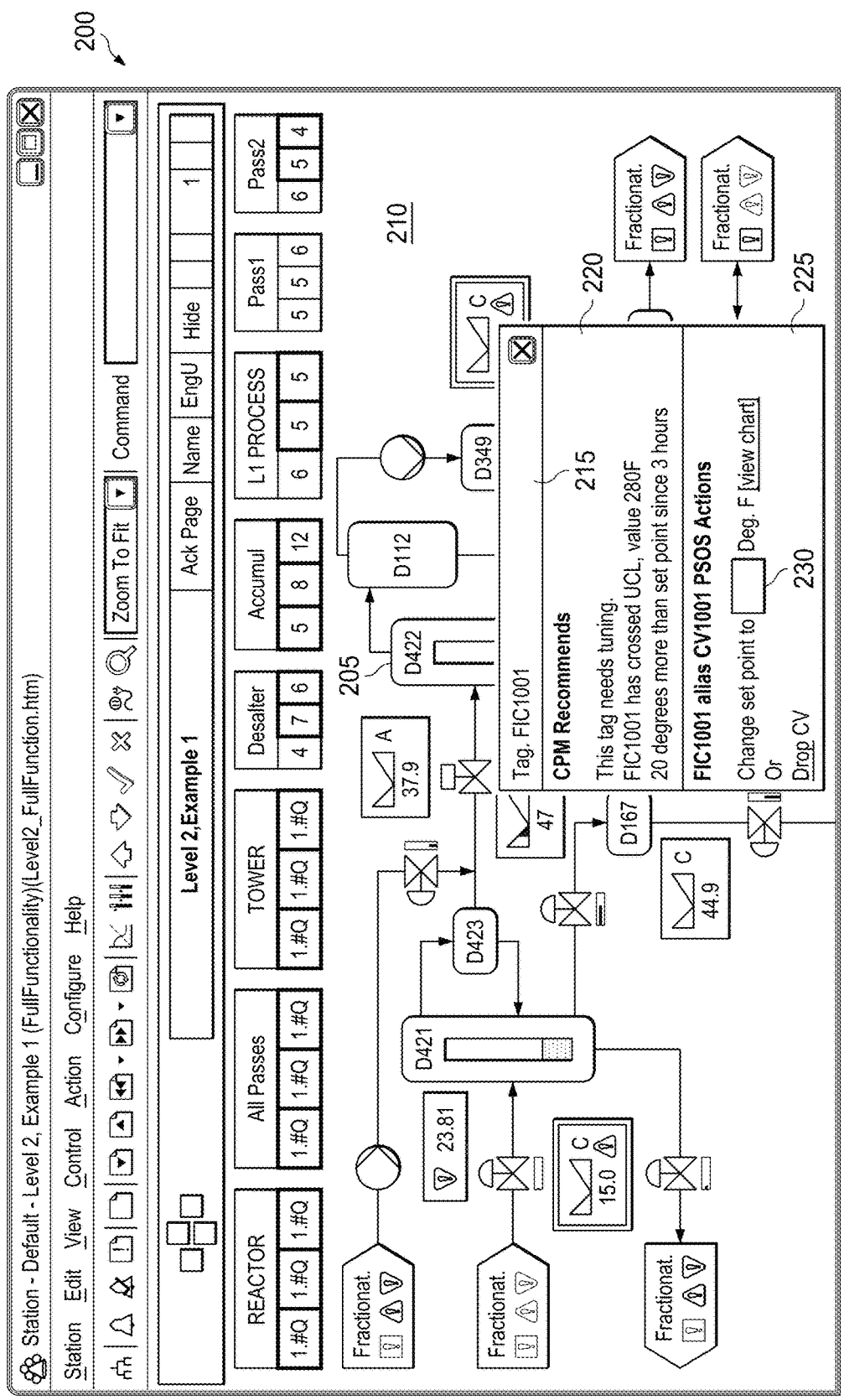
FIG. 2 illustrates an example HMI integrated display according to this disclosure.

FIG. 2 illustrates an example HMI integrated display 200 according to this disclosure. The embodiment of the HMI integrated display 200 illustrated in FIG. 2 is for illustration only. An HMI integrated display 200 may include a wide variety of configurations, and FIG. 2 does not limit the scope of this disclosure to any particular implementation of an HMI integrated display 200.

One or more of the operator stations 116, 124, 132, and 140 can display an HMI integrated display 200. The HMI integrated display 200 utilizes tags received by one or more applications. The HMI integrated display 200 also displays selected, grouped, or relevant information from each of the one or more applications. The information can be actionable information or information that will lead to actions or inferences for a particular piece of equipment or a measured parameter of a particular piece of equipment in the DCS. The HMI integrated display 200 assists operators and engineers to focus on the process graphics to operate the plant and the additional information and actionable suggestions that help in making the operation more efficient. The HMI integrated display 200 also gives a perspective from each asset (such as a particular application or a particular piece of equipment) to assist the operator or engineer to push a plant to its boundaries where profitability is achieved without compromising risk or safety.

The HMI integrated display 200 integrates monitoring and control information and displays the information in a standard DCS HMI graphical display within the Abnormal Situation Management (ASM) prescribed standards. The HMI integrated display 200 combines several advanced solution technologies (such as advanced applications) including Asset Monitoring (AM), Alarm Management (DynAMo), Controller Performance Monitoring (CPM), Advanced Process Control (APC), RTO, and the like to provide actionable solution oriented suggestions for an operator or engineer. The HMI integrated display 200 integrates relevant tag information and associated metadata from one or more applications. The tag information includes operational actionable information from each of the one or more applications. The HMI integrated display 200 also displays the metadata as part of a standard plant graphics layout. Thus, one single integrated user interface can assist an operator or engineer to run a plant safely and efficiently.

The HMI integrated display 200 can be a theme or context based HMIWeb display. The HMI integrated display 200 can include plant graphics with control health information, alarm information, and advanced controller context. The HMI integrated display 200 can provide relevant information in a single location while adhering to ASM standards.

The HMI integrated display 200 can be implemented in a plurality of situations. For example, the HMI integrated display 200 can provide CPM diagnoses for sticky valves, reduce integral action, tune functions, and Start operTune functions. The HMI integrated display 200 can also provide safety related information. Safety related information can include whether a regulatory controller is designated as an independent protection layer in a safety case of Level Of Protection Analysis (LOPA) as well as whether an alarm is defined as an independent protection layer in a safety case or LOPA. The HMI integrated display 200 can further provide equipment health information for pumps and compressors. Equipment health information can identify whether an equipment's performance is degraded as well as whether there are any precursor indicators of potential equipment unreliability. The HMI integrated display 200 can provide an interface to make work order requests for a piece of equipment, show scheduled maintenance for a piece of equipment, and allow an operator to navigate to a pending or completed work order on an asset.

The HMI integrated display 200 can provide several additional functions. For example, the HMI integrated display 200 can provide an interface to receive Advance Process Control (APC) limit changes. The HMI integrated display 200 can display information concerning why an APC variable is moving as well as why an APC is out of bounds or oscillatory. The HMI integrated display 200 can display predictions concerning whether a variable is expected to cross a threshold triggering an alarm. The HMI integrated display 200 can display disposition status of equipment, sensors, or actuators, allow an operator to flag issues in an operator log book, and enter annotations (such as through a faceplate type interface or the like). The HMI integrated display 200 can further display whether a control loop or measurement is used by other applications (such as advanced application, monitoring, and the like) as well as many more functions.

As discussed herein, the HMI integrated display 200 utilizes tags received by one or more applications and displays selected, grouped, or relevant information from each of the one or more applications. The information can include actionable information or information that will lead to actions or inferences for a particular piece of equipment or a measured parameter of a particular piece of equipment in the DCS. For example, when a particular issue occurs associated with a sensor 102a or an actuator 102b, an application interested in the issue publishes the issue as an event that includes a tag and metadata to one or more applications as discussed herein. Applications that are subscribed to an event check whether they can provide at least one of actionable information or contextual information related to the event. The HMI integrated display 200 collates all relevant actions and inferences associated with the tag and the metadata from the one or more application. The HMI integrated display 200 displays actionable context information that including displaying application specific events associated with the flag in a plant graphic display as well as provide useful actionable suggestions in response to issues identified by the tag and metadata.

FIG. 3 illustrates an example table 300 of actionable suggestions that a HMI integrated display 200 can provide when a CPM system detects an occurrence in a DCS according to this disclosure. The embodiment of the table 300 illustrated in FIG. 3 is for illustration only. However, table 300 may include a wide variety of configurations, and FIG. 3 does not limit the scope of this disclosure to any particular implementation of the table 300.

The table 300 also illustrates that the impact on multiple applications resulting from one issue can be predetermined and that such predetermined information can be used to form collaborative action to operate a plant effectively and smoothly. As shown in FIG. 3, when a CPM indicates that a sticky valve has occurred, the HMI integrated display 200 provides that the APC can relax the limits of the Controlled Variable (CV) because tight control cannot be achieved. Additionally, when a CPM indicates that a sticky valve has occurred, the HMI integrated display 200 also provides that the AM can shelve an alarm because the alarm will persist until a valve repair is complete. Furthermore, when a CPM indicates that a sticky valve has occurred, the HMI integrated display 200 also provides that an operator can reduce integral action. As also shown in FIG. 3, when a CPM indicates that a tuning issue has occurred, the HMI integrated display 200 provides that the APC can relax the CV performance ratio. Additionally, when a CPM indicates that a tuning issue has occurred, the HMI integrated display 200 also provides that the APC cannot perform any actions. Furthermore, when a CPM indicates that a sticky valve has occurred, the HMI integrated display 200 also provides that an operator can call operTune.

Returning to FIG. 2, when a component 205 is selected on a plant graphic 210 of an HMI integrated display 200, a display box 215 is depicted on the plant graphic 210. The display box 215 can provide one or more recommendations 220 related to the selected component 205. For example, as shown in FIG. 2, when a FIC 1001 tag is received based on selecting component 205, the display box 215 provides a recommendation 220 including CPM recommendations that recommend "tuning the tag," an indication that "FIC 1001 has crossed Upper Control Limit (UCL) value 280F," and "20 degrees more than set point since 30 hours." The display box 215 can also provide one or more actions 225 related to the selected component 205. For example, as shown in FIG. 2, when the FIC 1001 tag is received based on selecting component 205, the display box 215 provides actions 225 that include providing an input window 230 to receive an input of a changed temperature set point, providing a chart to determine a new set point, and providing a selection to drop CV.

Although FIG. 2 illustrates one example of an HMI integrated display 200, various changes may be made to FIG. 2. For example, various components in FIG. 2 could be combined, further subdivided, or omitted and additional components could be added according to particular needs.

FIG. 4 illustrates an example system 400 that includes a plurality of applications 405a-405n and an EPKS server 160 according to this disclosure. The embodiment of the system 400 illustrated in FIG. 4 is for illustration only. The system 400 can include a wide variety of configurations, and FIG. 4 does not limit the scope of this disclosure to any particular implementation of the system 400.

As discussed herein, because applications 405a-405n are independent of each other, the EPKS server 160 stores couplings between tags (along with their associated metadata) and different applications 405a-405n. The EPKS server 160 includes an Advanced Application Event Service server 410 that maintains an event registry 415 for events (such as issues identified by tags and their associated metadata) published by applications 405a-405n as well as each application 405a-405n registered to those events. For example, application 405a publishes its events through the Advanced Application Event Service server 410 of the EPKS server 160. Applications 405b-405n register with events published by application 405a to propose an action, recommendation, or solution. The event registry 415 also stores a coupling or link between one or more events from a first app (such as application 405a) with one or more actions of one or more other apps (such as applications 405b-405n).

Although FIG. 4 illustrates one example configuration of system 400, various changes may be made to FIG. 4. For example, various components in FIG. 4 could be combined, further subdivided, or omitted and additional components could be added according to particular needs.

FIG. 5 illustrates an example method 500 using the system 400 of FIG. 4. For ease of explanation, the method 500 is described as being performed by the EPKS server 160 in the system 400 of FIG. 4. However, the method 500 could be used with any suitable device or system.

At operation 505, the EPKS server 160 receives published advanced application events (such as issues identified by tags and associated metadata) of a particular application 405a. At operation 510, the EPKS server 160 registers actions of one or more other advanced applications 405b-405n with the published advanced application events. At operation 515, the EPKS server 160 stores the received published advanced application events coupled with actions of the one or more other advanced application events via an Advanced Application Event Service server 410 in an event registry 415 of the EPKS server 160.

Although FIG. 5 illustrates one example of a method 500, various changes may be made to FIG. 5. For example, while shown as a series of operations, various operations shown in FIG. 5 could overlap, occur in parallel, occur in a different order, or occur multiple times. Moreover, some operations could be combined or removed and additional operations could be added according to particular needs.

Figure 6:
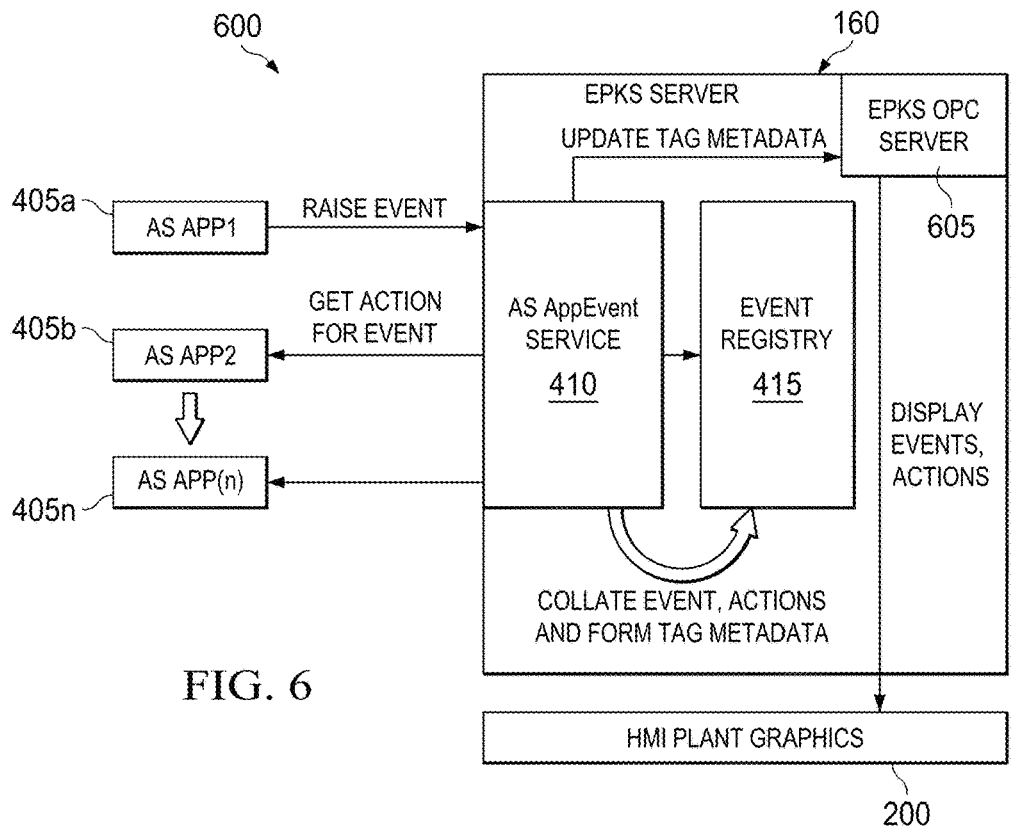
FIG. 6 illustrates another example system according to this disclosure.

FIG. 6 illustrates an example system 600 that includes a plurality of applications 405a-405n and an EPKS server 160 according to this disclosure. The embodiment of the system 600 illustrated in FIG. 6 is for illustration only. The system 600 can include a wide variety of configurations, and FIG. 6 does not limit the scope of this disclosure to any particular implementation of the system 600.

After the EPKS server 160 stores couplings or links between one or more events from a first app (such as application 405a) with one or more actions of one or more other apps (such as applications 405b-405n), application 405a raises an event. For example, the application 405a can transmit a tag and associated metadata of an event to the Advanced Application Event Service server 410 in the EPKS server 160. After receiving the tag and associated metadata of an event from the application 405a, the Advanced Application Event Service server 410 of the EPKS server 160 retrieves one or more actions from the one or more other applications 405b-405n for the event raised by the application 405a. The Advanced Application Event Service server 410 can determine which actions from which other one or more applications are to be retrieved based on stored links between one or more events from a first app (such as application 405a) with one or more actions of one or more other apps (such as applications 405b-405n) in the event registry 415.

After retrieving the one or more actions from the one or more other applications 405b-405n for the event raised by the application 405a, the Advanced Application Event Service server 410 collates the event using the tag of the event with the actions from applications 405b-405n linked to the tag. The Advanced Application Event Service server 410 updates the tag's metadata and transmits the tag, the updated metadata, and the actions to an EPKS OLE for Process Control (OPC) server 605 of the EPKS server 160. It should be understood that while EPKS OPC server 605 utilizes OPC communication, other communication mechanisms can be implemented in addition to or in lieu of OPC communication. The EPKS OPS server 605 transmits the tag, the updated metadata, and the actions to an operator station (such as operation stations 140, 132, 124, and 116 illustrated in FIG. 1). The operator station displays the tag indicating a particular sensor 102a or actuator 102b provided by an application 405a and a display box 215 to show actions and recommendation from applications 405b-405n as discussed herein in an HMI integrated display 200. In an embodiment, the HMI integrated display 200 can indicate a tag of a metadata change through a color change mechanism in the display 200 on the graphic associated with the tag. Subsequently, the HMI integrated display 200 can receive a selection on the graphic to display the display box 215 containing actions, recommendations, and statuses associated with the actions from applications 405b-405n.

Although FIG. 6 illustrates one example configuration of system 600, various changes may be made to FIG. 6. For example, various components in FIG. 6 could be combined, further subdivided, or omitted and additional components could be added according to particular needs.

Figure 7:
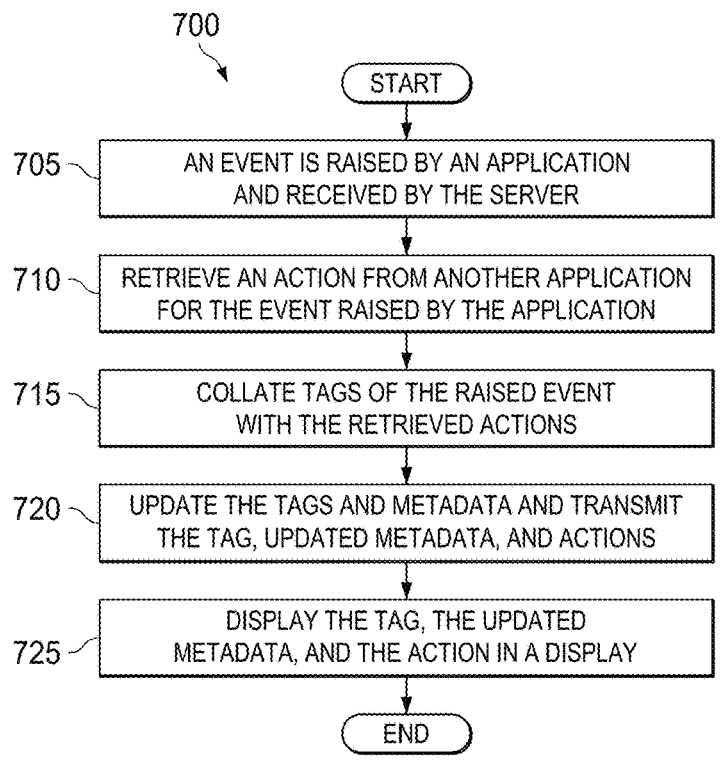
FIG. 7 illustrates another example method according to this disclosure.

FIG. 7 illustrates an example method 700 using the system 600 of FIG. 6. For ease of explanation, the method 700 is described as being performed by the EPKS server 160 in the system 600 of FIG. 6. However, the method 700 could be used with any suitable device or system.

At operation 705, the EPKS server 160 receives an event (such as an issue) raised by a particular application 405a. At operation 710, the EPKS server 160 retrieves one or more actions from the one or more other applications 405b-405n coupled to the event raised by the application 405a. The EPKS server 160, via the Advanced Application Event Service server 410, can determine which actions from which other one or more applications are to be retrieved based on stored links between one or more events (and their associated tags) from a first app (such as application 405a) with one or more actions of one or more other apps (such as applications 405b-405n) stored in the event registry 415.

At operation 715, the EPKS server 160, via the Advanced Application Event Service server 410, collates the event using the tag of the event with the actions from applications 405b-405n linked to the tag. At operation 720, the EPKS server 160, via the Advanced Application Event Service server 410, updates the tag's metadata and transmits the tag, the updated metadata, and the actions to an EPKS OPC server 605 of the EPKS server 160. At operation 725, the EPKS server 160, via the Advanced Application Event Service server 410, displays the tag indicating a particular sensor 102a or actuator 102b provided by an application 405a and a display box 215 to show actions and recommendation from applications 405b-405n as discussed herein in an HMI integrated display 200.

Although FIG. 7 illustrates one example of a method 700, various changes may be made to FIG. 7. For example, while shown as a series of operations, various operations shown in FIG. 7 could overlap, occur in parallel, occur in a different order, or occur multiple times. Moreover, some operations could be combined or removed and additional operations could be added according to particular needs.

Figure 8:
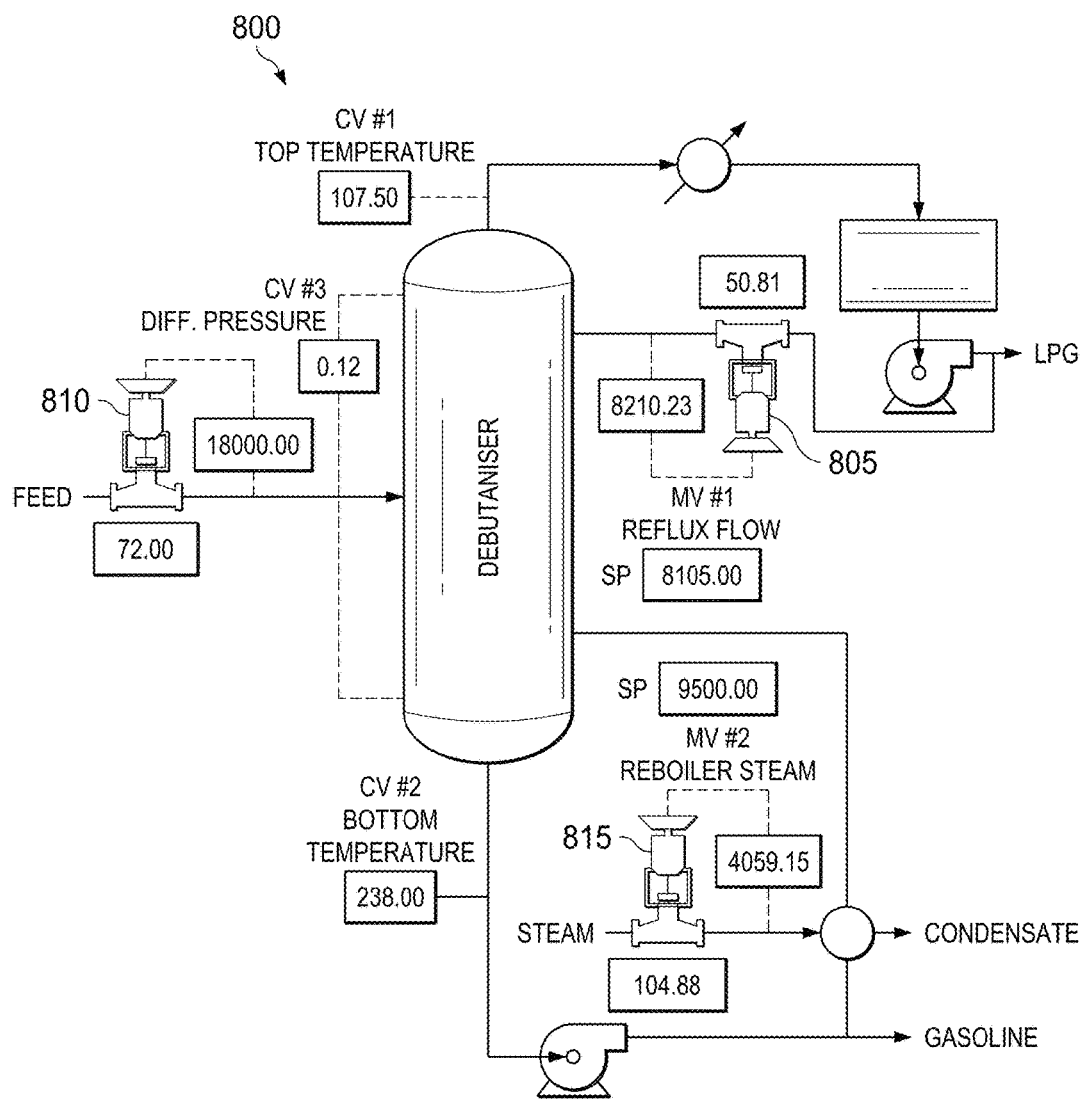
FIGS. 8 through 14 illustrate example HMI integrated displays according to this disclosure.

FIG. 8 illustrates an example HMI integrated display 800 according to this disclosure. The embodiment of the HMI integrated display 800 illustrated in FIG. 8 is for illustration only, and the HMI integrated display 200 of FIG. 2 could have the same or similar configuration. However, HMI integrated displays come in a wide variety of configurations, and FIG. 8 does not limit the scope of this disclosure to any particular implementation of an HMI integrated display.

As shown in FIG. 8, an HMI integrated display 800 supports applications at Level 3 connected to the plant using a profit suite application, a CPM lite application, and an Advanced Alarm Manager application. In the case of FIG. 8, an APC is not attaining optimal operating conditions due to an undersized valve for the process conditions. In response to determining that an undersized valve for the process conditions exists, the HMI integrated display 800 provides an indication for an operator to examine one or more valves, including a reflux flow control valve 805, a feed valve 810, and a boiler steam valve 815. An indication can include highlighting, shading, or marking particular equipment displayed on the HMI integrated display 800.

Although FIG. 8 illustrates one example configuration of an HMI integrated display 800, various changes may be made to FIG. 8. For example, various components in FIG. 8 could be combined, further subdivided, or omitted and additional components could be added according to particular needs.

Figure 9:
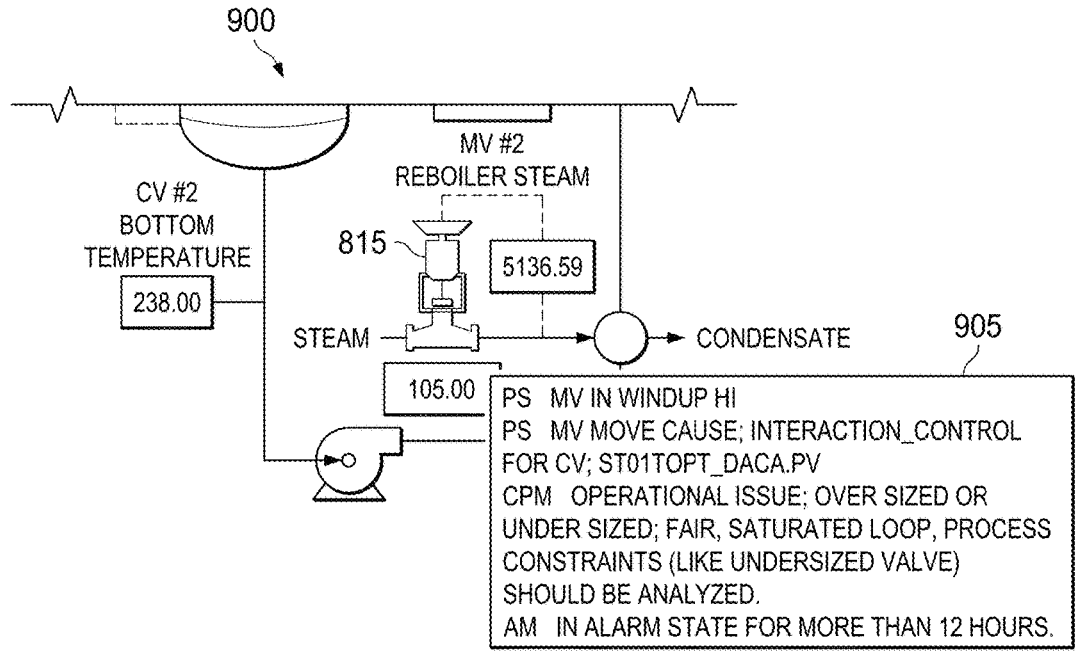

FIG. 9 illustrates an example HMI integrated display 900 according to this disclosure. The embodiment of the HMI integrated display 900 illustrated in FIG. 9 is for illustration only, and the HMI integrated display 200 of FIG. 2 or the HMI integrated display 800 of FIG. 8 could have the same or similar configuration. However, HMI integrated displays come in a wide variety of configurations, and FIG. 9 does not limit the scope of this disclosure to any particular implementation of an HMI integrated display.

After the HMI integrated display 800 provides an indication for an operator to examine valves 805, 810, and 815 as discussed in FIG. 8, the HMI integrated display can receive a selection of valve 815. Selecting an equipment (such as valve 815) on the HMI integrated display 900 includes for example receiving a mouse click while a cursor hovers over the equipment on the HMI integrated display 900, receiving an indication that a cursor has moved over the equipment on the HMI integrated display 900, or the like. In this case, the boiler steam valve 815 is wide open for a long period of time. In response to selecting the valve 815, a display box 905 displays actions from one or more applications associated with the valve 815. The display box 905 provides an operator with an opportunity to make an informed decision to begin troubleshooting.

Although FIG. 9 illustrates one example configuration of an HMI integrated display 900, various changes may be made to FIG. 9. For example, various components in FIG. 9 could be combined, further subdivided, or omitted and additional components could be added according to particular needs.

Figure 10:
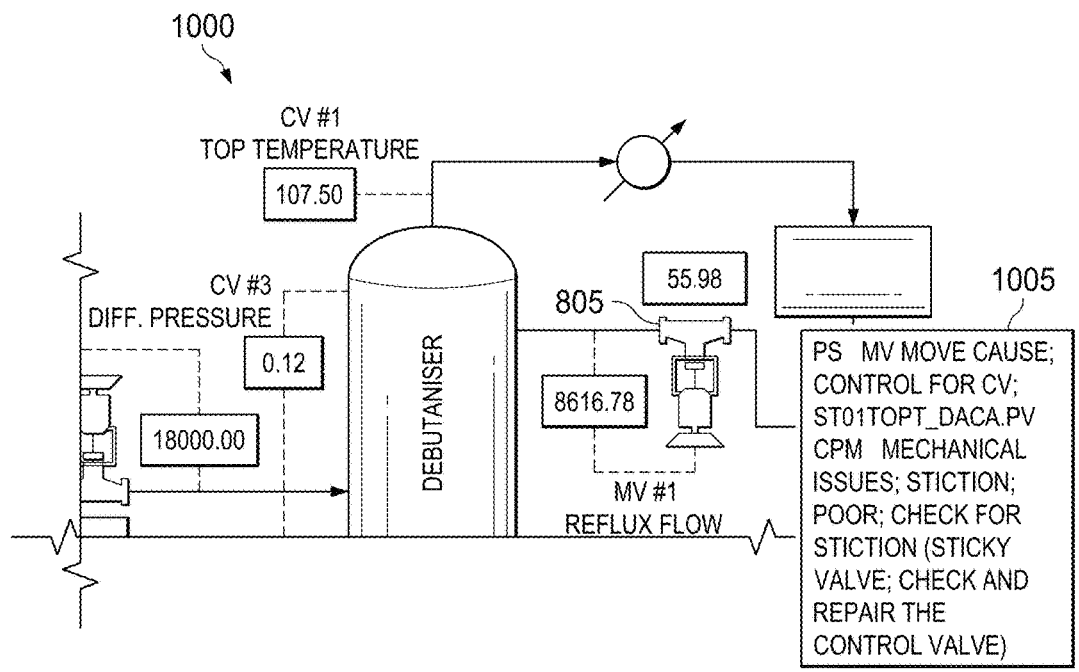

FIG. 10 illustrates an example HMI integrated display 1000 according to this disclosure. The embodiment of the HMI integrated display 1000 illustrated in FIG. 10 is for illustration only, and the HMI integrated display 200 of FIG. 2, the HMI integrated display 800 of FIG. 8, or the HMI integrated display 900 of FIG. 9 could have the same or similar configuration. However, HMI integrated displays come in a wide variety of configurations, and FIG. 10 does not limit the scope of this disclosure to any particular implementation of an HMI integrated display.

After the HMI integrated display 800 provides an indication for an operator to examine valves 805, 810, and 815 as discussed in FIG. 8, the HMI integrated display can receive a selection of valve 805. In this case, the reflux flow control valve 805 is hunting frequently. In response to selecting the valve 805, a display box 1005 displays actions from one or more applications associated with the valve 805. For example, as shown in FIG. 10, the display box 1005 indicates that there are mechanical issues which should be checked and repaired.

Although FIG. 10 illustrates one example configuration of an HMI integrated display 1000, various changes may be made to FIG. 10. For example, various components in FIG. 10 could be combined, further subdivided, or omitted and additional components could be added according to particular needs.

Figure 11:
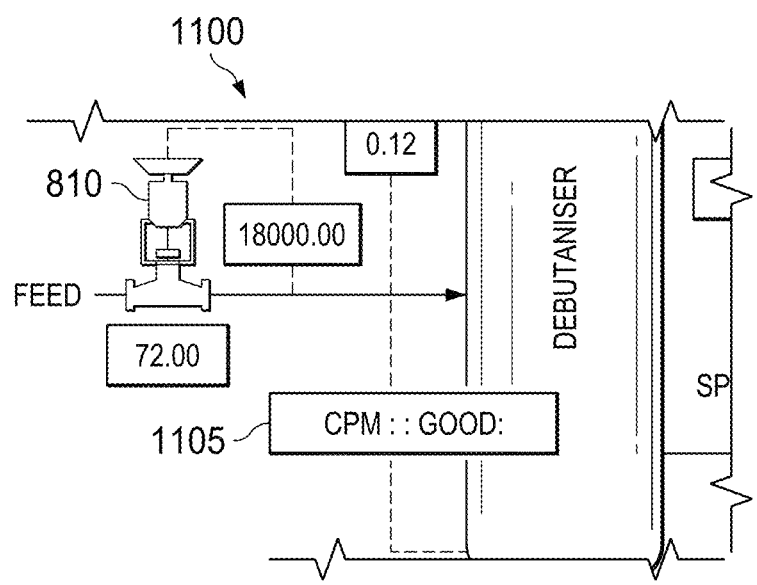

FIG. 11 illustrates an example HMI integrated display 1100 according to this disclosure. The embodiment of the HMI integrated display 1100 illustrated in FIG. 11 is for illustration only, and the HMI integrated display 200 of FIG. 2, the HMI integrated display 800 of FIG. 8, the HMI integrated display 900 of FIG. 9, or the HMI integrated display 1000 of FIG. 10 could have the same or similar configuration. However, HMI integrated displays come in a wide variety of configurations, and FIG. 11 does not limit the scope of this disclosure to any particular implementation of an HMI integrated display.

After the HMI integrated display 800 provides an indication for an operator to examine valves 805, 810, and 815 as discussed in FIG. 8, the HMI integrated display can receive a selection of valve 810. In response to selecting the valve 810, a display box 1105 displays information from one or more applications associated with the valve 810. For example, as shown in FIG. 11, the display box 1105 indicates that the performance of the valve 810 is good.

Although FIG. 11 illustrates one example configuration of an HMI integrated display 1100, various changes may be made to FIG. 11. For example, various components in FIG. 11 could be combined, further subdivided, or omitted and additional components could be added according to particular needs.

Figure 12:
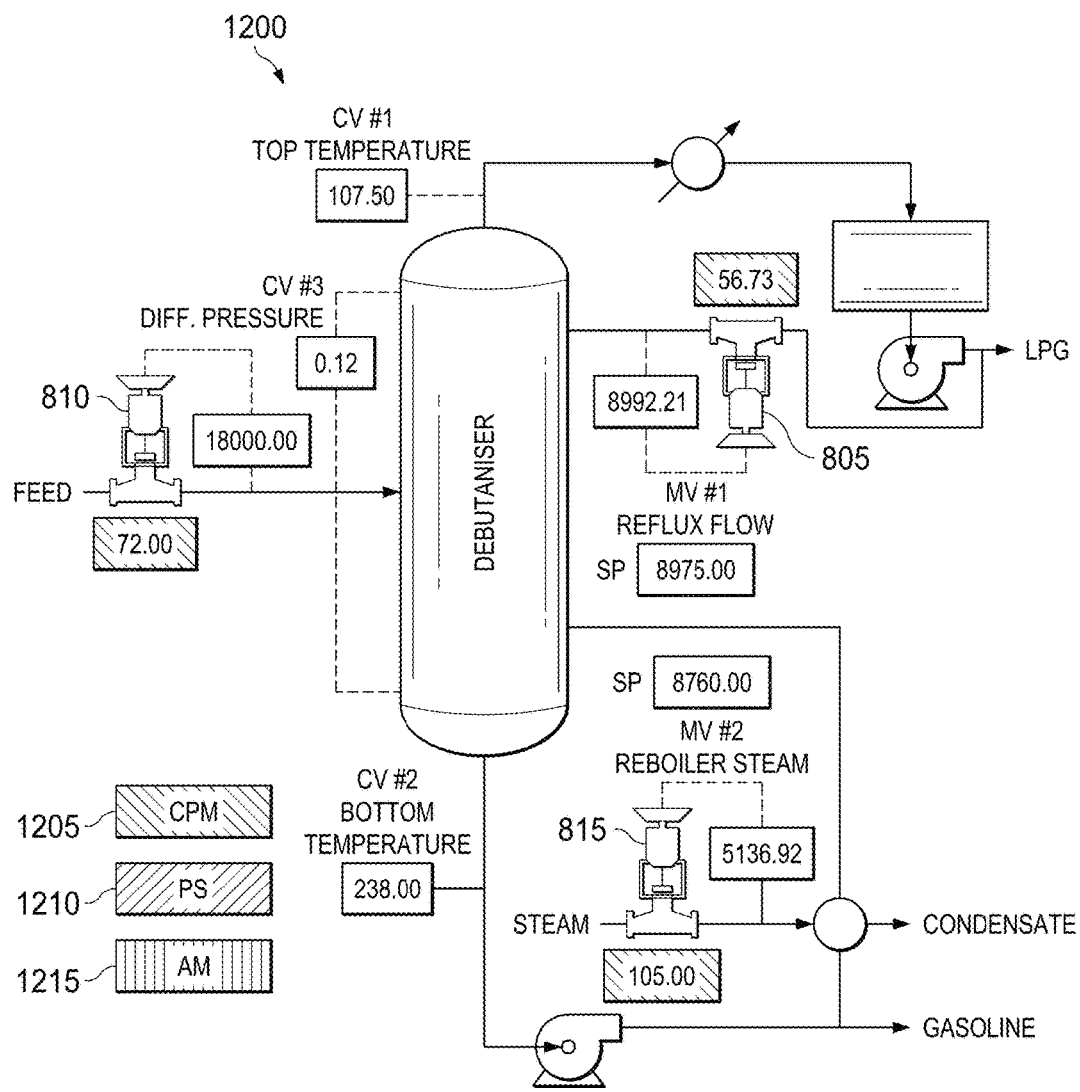

FIG. 12 illustrates an example HMI integrated display 1200 according to this disclosure. The embodiment of the HMI integrated display 1200 illustrated in FIG. 12 is for illustration only, and the HMI integrated display 200 of FIG. 2, the HMI integrated display 800 of FIG. 8, the HMI integrated display 900 of FIG. 9, the HMI integrated display 1000 of FIG. 10, or the HMI integrated to display 1100 of FIG. 11 could have the same or similar configuration. However, HMI integrated displays come in a wide variety of configurations, and FIG. 12 does not limit the scope of this disclosure to any particular implementation of an HMI integrated display.

After the HMI integrated display 800 provides an indication for an operator to examine valves 805, 810, and 815 as discussed in FIG. 8, the HMI integrated display 1200 can display input boxes 1205, 1210 and 1215. Input box 1205 commands the HMI integrated display 1200 to display all messages or actions associated with the CPM lite application for each of the valves 805, 810, and 815. In this case, in response to receiving a selection at input box 1205, the HMI integrated display 1200 provides an indication that each valve 805, 810, and 815 has actions or messages from the CPM lite application. An indication can include highlighting, shading, or marking particular equipment displayed on the HMI integrated display 1200.

Although FIG. 12 illustrates one example configuration of an HMI integrated display 1200, various changes may be made to FIG. 12. For example, various components in FIG. 12 could be combined, further subdivided, or omitted and additional components could be added according to particular needs.

Figure 13:
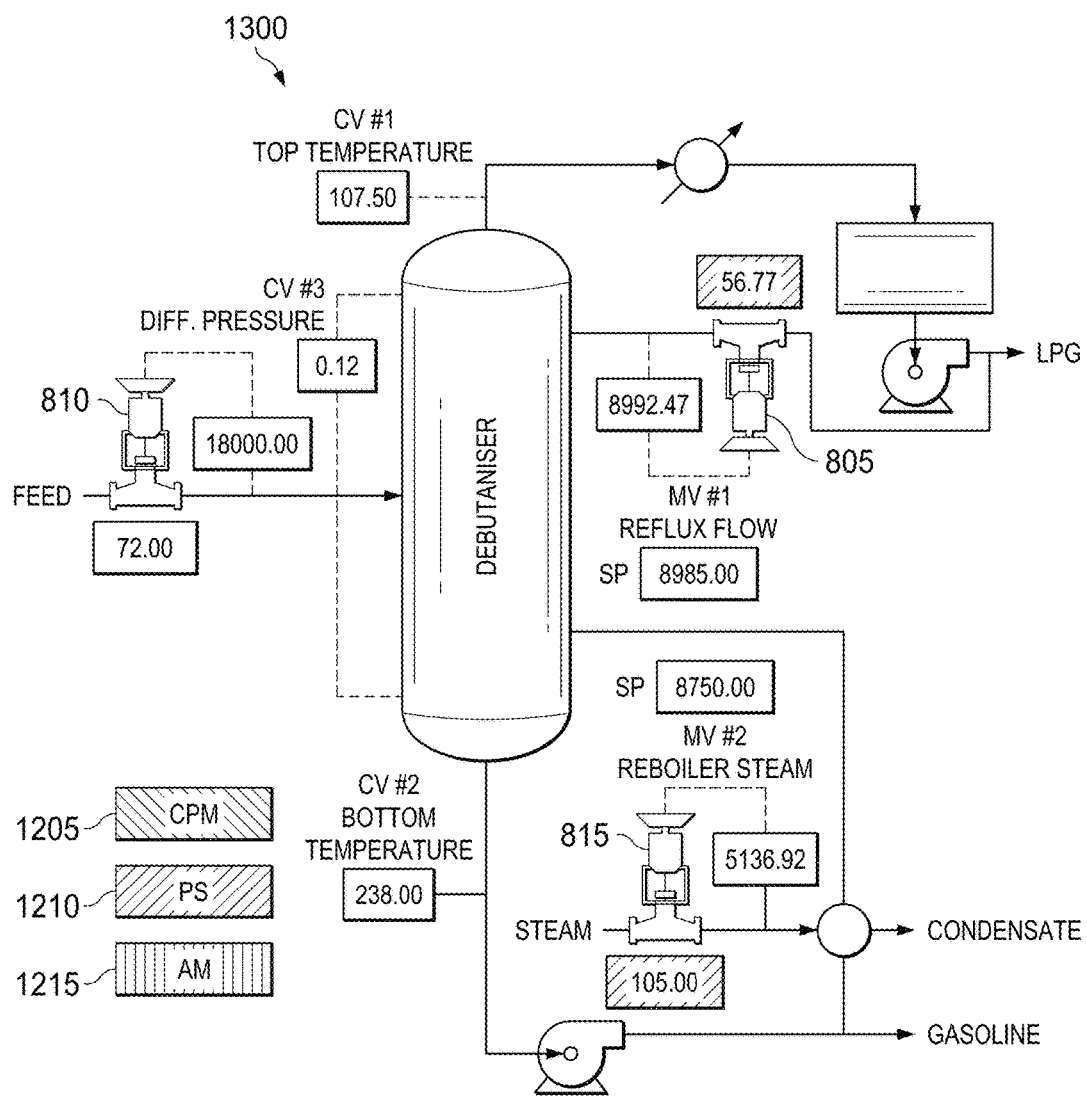

FIG. 13 illustrates an example HMI integrated display 1300 according to this disclosure. The embodiment of the HMI integrated display 1300 illustrated in FIG. 13 is for illustration only, and the HMI integrated display 200 of FIG. 2, the HMI integrated display 800 of FIG. 8, the HMI integrated display 900 of FIG. 9, the HMI integrated display 1000 of FIG. 10, the HMI integrated display 1100 of FIG. 11, or the HMI integrated display 1200 of FIG. 12 could have the same or similar configuration. However, HMI integrated displays come in a wide variety of configurations, and FIG. 13 does not limit the scope of this disclosure to any particular implementation of an HMI integrated display.

After the HMI integrated display 800 provides an indication for an operator to examine valves 805, 810, and 815 as discussed in FIG. 8, the HMI integrated display 1300 can display input boxes 1205, 1210 and 1215. Input box 1210 commands the HMI integrated display 1300 to display all messages or actions associated with the profit suite application for each of the valves 805, 810, and 815. In this case, in response to receiving a selection at input box 1210, the HMI integrated display 1300 provides an indication that each valve 805 and 815 has actions or messages from the profit suite application. An indication can include highlighting, shading, or marking particular equipment displayed on the HMI integrated display 1300.

Although FIG. 13 illustrates one example configuration of an HMI integrated display 1300, various changes may be made to FIG. 13. For example, various components in FIG. 13 could be combined, further subdivided, or omitted and additional components could be added according to particular needs.

Figure 14:
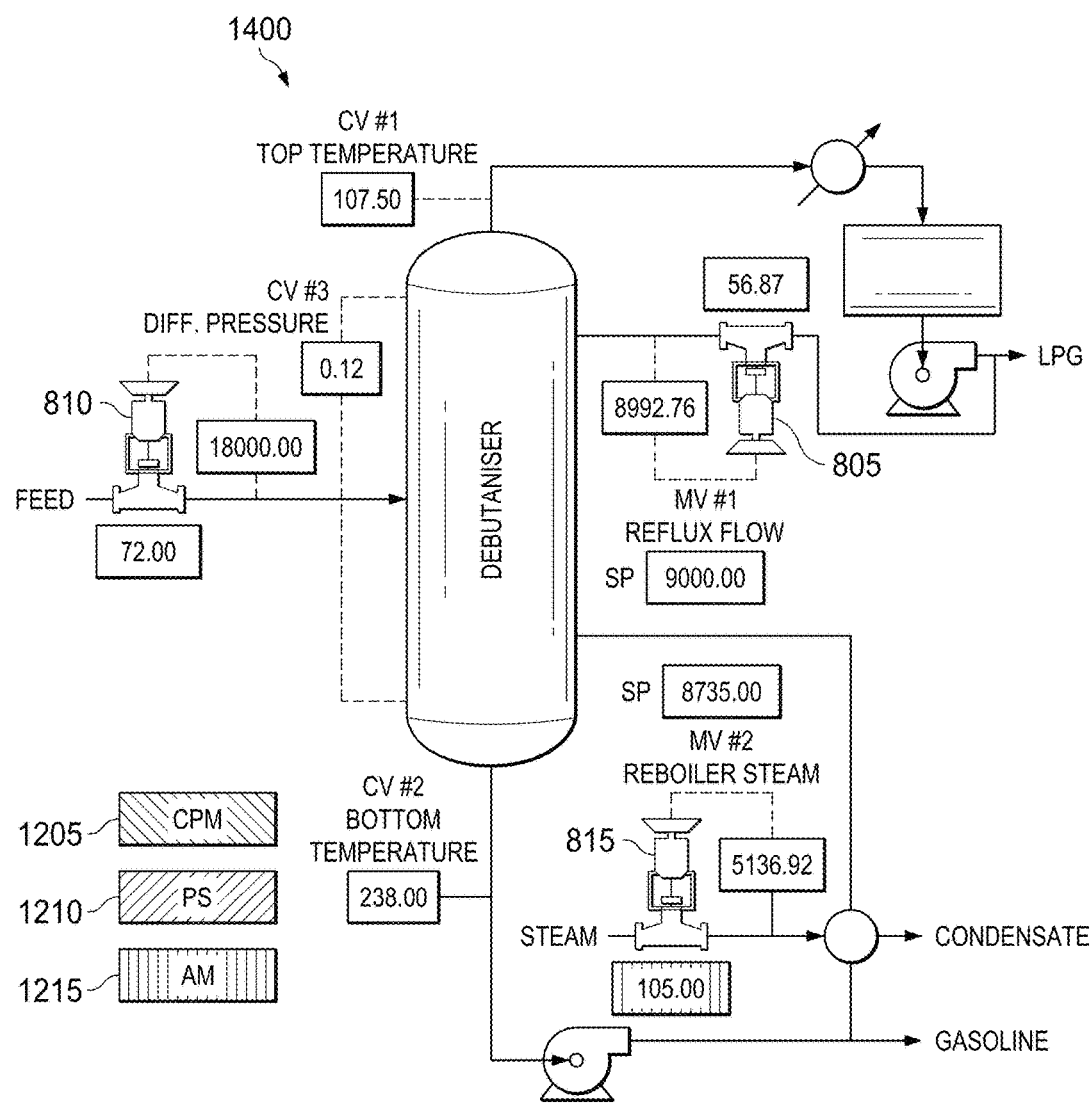

FIG. 14 illustrates an example HMI integrated display 1400 according to this disclosure. The embodiment of the HMI integrated display 1400 illustrated in FIG. 14 is for illustration only, and the HMI integrated display 200 of FIG. 2, the HMI integrated display 800 of FIG. 8, the HMI integrated display 900 of FIG. 9, the HMI integrated display 1000 of FIG. 10, the HMI integrated display 1100 of FIG. 11, the HMI integrated display 1200 of FIG. 12, or the HMI integrated display 1300 of FIG. 13 could have the same or similar configuration. However, HMI integrated displays come in a wide variety of configurations, and FIG. 14 does not limit the scope of this disclosure to any particular implementation of an HMI integrated display.

After the HMI integrated display 800 provides an indication for an operator to examine valves 805, 810, and 815 as discussed in FIG. 8, the HMI integrated display 1400 can display input boxes 1205, 1210 and 1215. Input box 1215 commands the HMI integrated display 1400 to display all messages or actions associated with the Advance Alarm Manager application for each of the valves 805, 810, and 815. In this case, in response to receiving a selection at input box 1215, the HMI integrated display 1400 provides an indication that only valve 815 has actions or messages from the Advance Alarm Manager application. An indication can include highlighting, shading, or marking particular equipment displayed on the HMI integrated display 1400.

Although FIG. 14 illustrates one example configuration of an HMI integrated display 1400, various changes may be made to FIG. 14. For example, various components in FIG. 14 could be combined, further subdivided, or omitted and additional components could be added according to particular needs.

Figure 15:
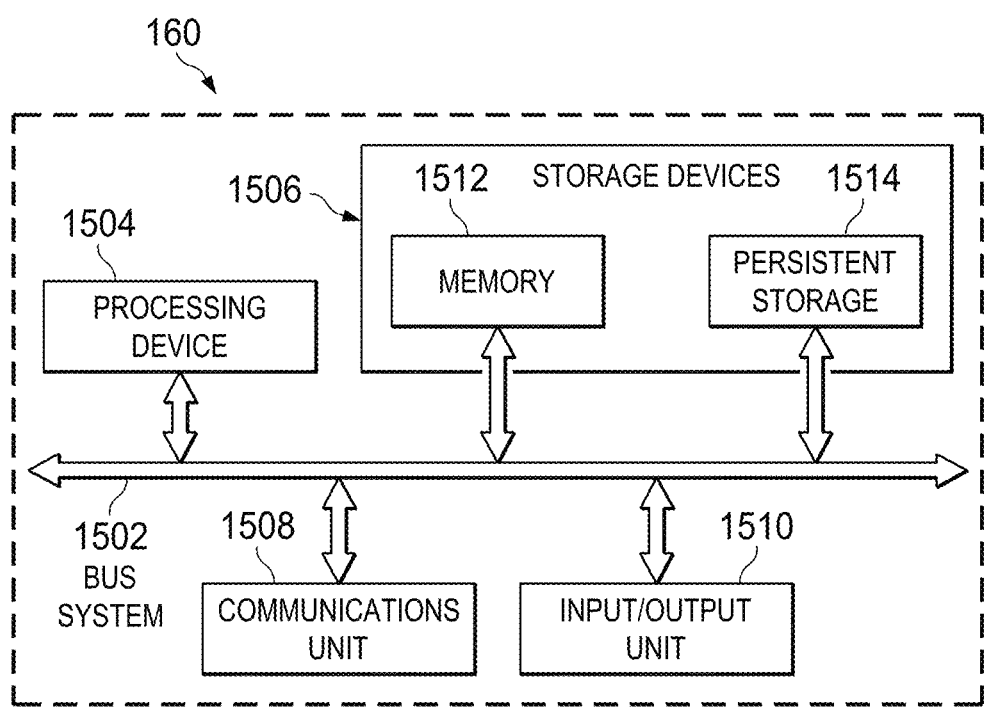
FIG. 15 illustrates an example EPKS server according to this disclosure.

FIG. 15 illustrates an example configuration of an EPKS server 160 according to this disclosure. The server 160 receives, from a first application, a tag indicating an event of an equipment. The server 160 also retrieves, from at least a second application, an action linked to the event based on the tag. The server 160 transmits the tag indicating the event and the action linked to event. In addition, the server 160 displays, on a plant graphic (such as an HMI integrated display), a location of the event using the tag and the action linked to the event.

As shown in FIG. 15, the EPKS server 160 includes a bus system 1502, which supports communication between at least one processing device 1504, at least one storage device 1506, at least one communications unit 1508, and at least one input/output (I/O) unit 1510. The processing device 1504 executes instructions that may be loaded into a memory 1512. The processing device 1504 may include any suitable number(s) and type(s) of processors or other devices in any suitable arrangement. Example types of processing devices 1504 include microprocessors, microcontrollers, digital signal processors, field programmable gate arrays, application specific integrated circuits, and discrete circuitry.

The memory 1512 and a persistent storage 1514 are examples of storage devices 1506, which represent any structure(s) capable of storing and facilitating retrieval of information (such as data, program code, and/or other suitable information on a temporary or permanent basis). The memory 1512 may represent a random access memory or any other suitable volatile or non-volatile storage device(s). The persistent storage 1514 may contain one or more components or devices supporting longer-term storage of data, such as a ready only memory, hard drive, flash memory, or optical disc.

The communications unit 1508 supports communications with other systems or devices. For example, the communications unit 1508 could include a network interface card that facilitates communications over at least one Ethernet network. The communications unit 1508 could also include a wireless transceiver facilitating communications over at least one wireless network. The communications unit 1508 may support communications through any suitable physical or wireless communication link(s).

The I/O unit 1510 allows for input and output of data. For example, the I/O unit 1510 may provide a connection for user input through a keyboard, mouse, keypad, touchscreen, or other suitable input device. The I/O unit 1510 may also send output to a display, printer, or other suitable output device.

Although FIG. 15 illustrates one example configuration of an EPKS server, various changes may be made to FIG. 15. For example, various components in FIG. 15 could be combined, further subdivided, or omitted, and additional components could be added according to particular needs. Also, computing devices can come in a wide variety of configurations, and FIG. 15 does not limit this disclosure to any particular configuration of computing device.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for an intelligent human machine interface (HMI) for effective process operations in an industrial process control and automation system, the method comprising:

receiving, from a first application, a tag associated with an equipment included in distributed control system (DCS) of the industrial process control and automation system, wherein the tag indicating an event associated to the equipment includes at least one of a controller, a sensor or an actuator;

retrieving, from at least a second application, at least an action linked to the event based on the tag received from the first application, wherein the tag includes metadata associated with a parameter of the event;

providing at least one of diagnoses, safety information, or health information, as the metadata from one or more application, corresponding to the parameter of the event;

collating the tag and the actions to update the metadata associated with the parameter of the event based on retrieving the action linked to the event;

transmitting the updated metadata and the tag indicating the event and the action linked to the event to a HMI display;

selecting at least one component on the HMI display and providing actionable recommendations based on the selection of the at least one component; and displaying, on the HMI display, a location of the event using the tag and the action linked to the event, wherein content for display is based on the updated metadata, and wherein the action provides the actionable recommendations and predetermined information corresponding to the event associated to the equipment.

2. The method of claim 1, further comprising before receiving, from the first application, the tag associated with the equipment, the tag indicating the event:

receiving, from the first application, the tag associated with the equipment, the tag indicating a published event;

registering the action from the second application with the tag indicating the published event; and storing a link coupling the action from the second application with the tag indicating the published event.

3. The method of claim 1, wherein the action linked to the event is displayed in response to receiving a selection of the event on the HMI display.

4. The method of claim 1, wherein the event comprises an application event of interest to an operator.

5. The method of claim 1, wherein the action comprises at least one of safety related information, an equipment health, an expected parameter of the equipment, a disposition status of the equipment, or a work order request associated with the equipment.

6. An apparatus for an intelligent human machine interface (HMI) for effective process operations in an industrial process control and automation system, the apparatus comprising:

at least one processing device configured to:

receive, from a first application, a tag associated with an equipment included in distributed control system (DCS) of the industrial process control and automation system, wherein the tag indicating an event associated to the equipment includes at least one of a controller, a sensor or an actuator;

retrieve, from at least a second application, at least an action linked to the event based on the tag received from the first application, wherein the tag includes metadata associated with a parameter of the event;

provide at least one of diagnoses, safety information, or health information, as the metadata from one or more application, corresponding to the parameter of the event;

collate the tag and the actions to update the metadata associated with the parameter of the event based on retrieving the action linked to the event;

transmit the updated metadata and the tag indicating the event and the action linked to the event to a HMI display;

select at least one component on the HMI display and provide actionable recommendations based on the selection of the at least one component; and display, on the HMI display, a location of the event using the tag and the action linked to the event, wherein content for display is based on the updated metadata, and wherein the action provides the actionable recommendations and predetermined information corresponding to the event associated to the equipment.

7. The apparatus of claim 6, wherein before receiving, from the first application, the tag indicating the event, the at least one processing device is configured to:

receive, from the first application, the tag associated with the equipment, the tag indicating a published event;

register the action from the second application with the tag indicating the published event; and store a link coupling the action from the second application with the tag indicating the published event.

8. The apparatus of claim 6, wherein the at least one processing device is configured to display the action linked to the event in response to receiving a selection of the event on the HMI display.

9. The apparatus of claim 6, wherein the event comprises an application event of interest to an operator.

10. The apparatus of claim 6, wherein the action comprises at least one of safety related information, an equipment health, an expected parameter of the equipment, a disposition status of the equipment, or a work order request associated with the equipment.

11. An apparatus for an intelligent human machine interface (HMI) for effective process operations in an industrial process control and automation system, the apparatus comprising:

at least one processing device configured to:

receive, from a first application, a tag associated with an equipment included in distributed control system (DCS) of the industrial process control and automation system, wherein the tag indicating an event of the equipment and metadata associated with the event and the equipment associated to at least one of a controller, a sensor or an actuator;

retrieve, from at least a second application, at least an action linked to the event based on the tag received from the first application, wherein the tag includes metadata associated with a parameter of the event;

provide at least one of diagnoses, safety information, or health information, as the metadata from one or more application, corresponding to the parameter of the event;

update the metadata associated with the parameter of the event based on retrieving the action linked to the event by collating the action with the event;

transmit the tag indicating the event, the updated metadata, and the action linked to the event to a HMI display;

select at least one component on the HMI display and provide actionable recommendations based on the selection of the at least one component; and display, on the HMI display, a location of the event using the tag, the updated metadata, and the action linked to the event, wherein content for display is based on the updated metadata, and wherein the action provides actionable recommendations and predetermined information corresponding to the event associated to the equipment.

12. The apparatus of claim 11, wherein before receiving, from the first application, the tag indicating the event, the at least one processing device is configured to:

receive, from the first application, the tag associated with the equipment, the tag indicating a published event;

register the action from the second application with the tag indicating the published event; and store a link coupling the action from the second application with the tag indicating the published event.

13. The apparatus of claim 11, wherein the at least one processing device is configured to display the action linked to the event in response to receiving a selection of the event on the HMI display.

14. The apparatus of claim 11, wherein the event comprises an application event of interest to an operator.

15. The apparatus of claim 11, wherein the action comprises at least one of safety related information, an equipment health, an expected parameter of the equipment, a disposition status of the equipment, or a work order request associated with the equipment.

* * * * *